2,777,686
Patented Jan. 15, 1957

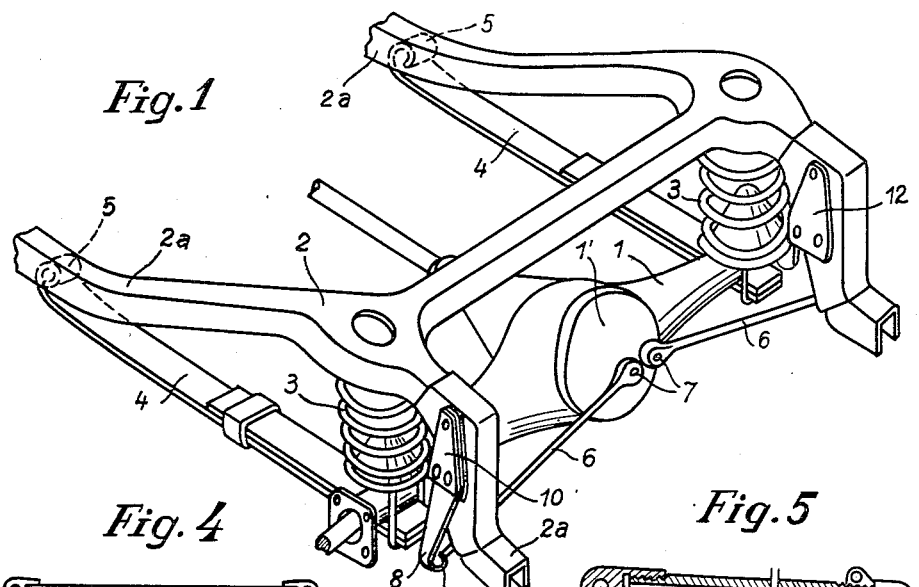
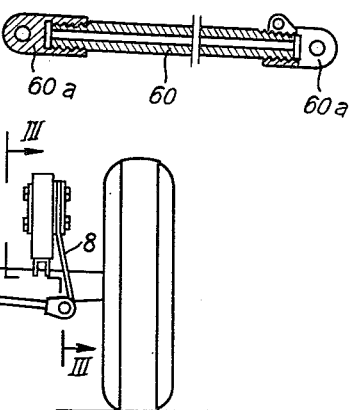
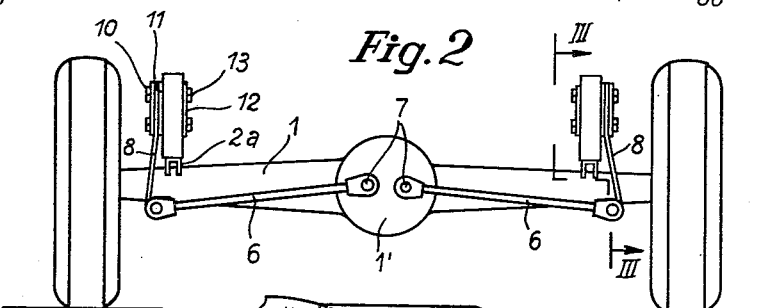
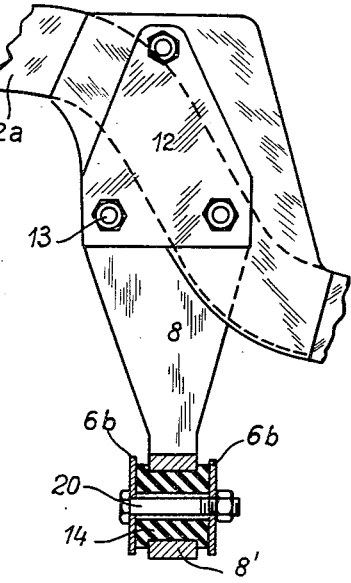

2,777,686
REAR WHEEL SUSPENSION FOR MOTOR VEHICLES

Dante Giacosa and Angelo Mosso, Turin, Italy

Application August 12, 1954, Serial No. 449,298

5 Claims. (Cl. 267—16)

This invention relates to a rear axle suspension for motor vehicles and is a continuation-in-part of our co-pending application Ser. No. 239,421, filed July 31, 1951, now Patent No. 2,726,857. Broadly speaking, this invention relates to a rear suspension for motor vehicles of the type in which the rear axle bears against the vehicle frame by means of helical springs and is pivotally connected with said frame through two longitudinal arms articulated to the longitudinal members of said frame or an equivalent member of chassisless body, hereinafter briefly denominated "frame."

The object of this invention is to provide a cross connection between the axle and frame of a nature such as to constitute an additional resilient system, so as to obtain a suspension of variable flexibility depending upon the load applied to the axle with respect to the frame.

More particularly, it is the object of this invention to provide a transverse connection between the axle and frame comprising supplementary resilient means cooperating with the helical springs and adapted to afford a resilient resistance increasing with the increase of the load applied to the springs.

Further objects of this invention will result from the following description in which reference is made to the accompanying drawing, wherein:

Figure 1 is a perspective view of a construction of the suspension according to this invention;

Figure 2 is a diagrammatic rear view;

Figure 3 is a sectional view on an enlarged scale on line III—III of Figure 2;

Figure 4 and 5 show two transverse rod constructions.

The type of rear suspension to which the invention applies comprises a rear axle 1, bearing against the frame 2 of the motor vehicle by means of helical springs 3 and connected to the longitudinal members 2a of the frame by means of longitudinal arms 4 articulated at 5, so that the axle 1 is free to oscillate in operation compressing more or less the helical springs 3.

According to this invention, a transverse connection between the axle 1 and frame 2 is provided, said connection consisting of two substantially rigid transverse rods 6 articulated at 7 to the central portion 1' of the axle 1 and connected each at their opposite ends to a depending leaf spring 8 secured at its upper end to the longitudinal member of the frame 2.

According to a preferred embodiment, each spring 8 has its upper portion arranged between two plates 10, 11 and the whole is applied to the outer face of the member 2a. A further plate 12 is fitted to the inner face of the member 2a and the unit 8, 10, 11 and 12 is secured by means of bolts 13 (Figures 2 and 3). As will be clearly seen in Figure 2, the springs 8 diverge at their free ends downwardly.

The rods 6 each comprise a body 6a and eye-shaped ends 6b (Figure 4) for pivotal attachment to the portion 1' of the axle, on one hand, and to the eye-shaped end 8' of the spring 8, on the other hand. The rods 6 can also be formed with a tubular body 60 with two eye-shaped caps 60a screwed at its ends, as indicated in Figure 4. The eye-shaped end of the rod 6 adjacent to the spring 8 is conveniently bifurcated, as shown in Figure 3. 20 is the bolt connecting the bifurcated end of the rod 6 to the eye-shaped end of the leaf spring 8.

In operation the axle 1 performs oscillatory movements in a substantially vertical plane, the points of articulation 7 (Fig. 2), which are fixed with respect to the axle carry along the arms 6 against the action of springs 8 which bend more or less thereby adding a certain (variable) force to the reaction force of helical springs 3. However, since during these movements the arms 6 are also subjected to torque stresses (it will be sufficient to note that the true motion of the axle 1 is performed along an arc about the centres 5), a non-torsional connection between the rods and springs 8 is provided, consisting of resilient bushings 14, for instance of rubber, interposed at the articulated connections between springs 8 and the said arms. Moreover, it will be seen in Figure 2 that the connecting members 6 and 8 resiliently hold the axle 1 to the frame 2 in a transverse direction.

It will be understood that the invention as described above and as illustrated can be modified in various manners without departing from the scope of the appended claims.

What we claim is:

1. Rear axle suspension for motor vehicles comprising in combination helical springs interposed between the frame and axle, longitudinal reaction arms articulated at one end to the frame and secured by their other end to the axle, substantially rigid rods extending transversely of the vehicle from a central portion of the axle, depending leaf springs secured to the frame, an eye-shaped end at the depending portion of each spring, each of said rods being hinged at one end of the axle and at its other end to the said eye-shaped end.

2. Rear axle suspension for motor vehicles comprising in combination helical springs interposed between the frame and axle, longitudinal reaction arms articulated at one end to the frame and secured by their other end to the axle, substantially rigid rods extending transversely of the vehicle from a central portion of the axle, depending leaf springs secured to the frame, an eye-shaped end at the depending portion of each spring, an articulated connection between one end of the rods and the axle, a resilient bushing within said eye-shaped end of each spring, and a bolt connecting the other end of each rod with said eye-shaped end through the bushing.

3. Rear axle suspension for motor vehicles comprising in combination helical springs interposed between the frame and axle, longitudinal reaction arms articulated at one end to the frame and secured by their other end to the axle, substantially rigid rods extending transversely of the vehicle from a central portion of the axle, downwardly diverging depending leaf springs secured to the frame, an eye-shaped end at the depending portion of each spring, each of said rods being hinged at one end to the axle and at its other end to the said eye-shaped end.

4. Rear axle suspension for motor vehicles comprising in combination helical springs interposed between the axle and frame, longitudinal reaction arms articulated at one end to the frame and secured by their other end to the axle, substantially rigid rods extending transversely of the vehicle from a central portion of the axle, depending leaf springs secured to the frame, an eye-shaped end at the depending portion of each spring, a hinged connection between one end of each rod and the axle, and a resilient connection between the other end of the rod and the said eye-shaped end of the spring.

5. Rear axle suspension for motor vehicles comprising in combination helical springs interposed between the axle and frame, longitudinal reaction arms articulated at one end of the frame and secured by their other end to the axle, substantially rigid rods extending transversely of the vehicle from a central portion of the axle, downwardly diverging depending leaf springs secured to the frame, an eye-shaped end at the depending portion of each spring, a hinged connection between one end of each rod and the axle, and a resilient connection between the other end of the rod and the said eye-shaped end of the spring.

References Cited in the file of this patent

UNITED STATES PATENTS

| | | |
|---|---|---|
| Re. 14,192 | Trott | Sept. 12, 1916 |
| 1,231,066 | Reynolds et al. | June 26, 1917 |
| 1,544,708 | Wells | July 7, 1925 |
| 1,563,547 | Bovee | Dec. 1, 1925 |
| 2,182,248 | Chayne | Dec. 5, 1939 |
| 2,234,025 | Dellart | Mar. 4, 1941 |
| 2,300,844 | Olley | Nov. 3, 1942 |